(12) United States Patent
Morikawa et al.

(10) Patent No.: US 11,557,787 B2
(45) Date of Patent: Jan. 17, 2023

(54) NONAQUEOUS ELECTROLYTE SECONDARY BATTERY AND SECONDARY BATTERY MODULE

(71) Applicants: Panasonic Corporation, Kadoma (JP); TOYOTA JIDOSHA KABUSHIKI KAISHA, Toyota (JP)

(72) Inventors: Yuki Morikawa, Hyogo (JP); Takuya Asari, Hyogo (JP); Harunari Shimamura, Hyogo (JP); Kouhei Tsuzuki, Hyogo (JP); Katsunori Yanagida, Hyogo (JP); Yo Kato, Nagoya (JP)

(73) Assignees: PANASONIC HOLDINGS CORPORATION, Kadoma (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/200,084

(22) Filed: Mar. 12, 2021

(65) Prior Publication Data

US 2021/0296683 A1 Sep. 23, 2021

(30) Foreign Application Priority Data

Mar. 17, 2020 (JP) .............................. JP2020-046539

(51) Int. Cl.
| | |
|---|---|
| *H01M 10/00* | (2006.01) |
| *H01M 10/0525* | (2010.01) |
| *H01M 10/0561* | (2010.01) |
| *H01M 4/66* | (2006.01) |
| *H01M 4/02* | (2006.01) |

(52) U.S. Cl.
CPC ....... *H01M 10/0525* (2013.01); *H01M 4/662* (2013.01); *H01M 10/0561* (2013.01); *H01M 2004/021* (2013.01); *H01M 2004/027* (2013.01); *H01M 2004/028* (2013.01); *H01M 2300/002* (2013.01)

(58) Field of Classification Search
CPC ............. H01M 4/133; H01M 10/0525; H01M 2004/028; H01M 4/583; H01M 4/662; Y02P 70/50; Y02E 60/10
See application file for complete search history.

(56) References Cited

U.S. PATENT DOCUMENTS

2019/0198857 A1* 6/2019 Oh .................... H01M 10/0525
2021/0013496 A1 1/2021 Tsuzuki et al.

FOREIGN PATENT DOCUMENTS

WO 2019/187537 A1 10/2019

\* cited by examiner

*Primary Examiner* — Cynthia H Kelly
*Assistant Examiner* — Monique M Wills
(74) *Attorney, Agent, or Firm* — WHDA, LLP

(57) ABSTRACT

The present disclosure relates to a secondary battery module including a nonaqueous electrolyte secondary battery and an elastic body. The elastic body has a compressive elastic modulus of 5 MPa to 120 MPa. The positive electrode includes a positive electrode collector with a thermal conductive rate of 65 W/(m·K) to 150 W/(m·K). The negative electrode includes a negative electrode active material layer including a first layer and a second layer sequentially formed from a side with the negative electrode collector. The first layer contains first carbon-based active material particles with a 10% proof stress of 3 MPa or less. The second layer contains second carbon-based active material particles with a 10% proof stress of 5 MPa or greater.

5 Claims, 8 Drawing Sheets

NONAQUEOUS ELECTROLYTE SECONDARY BATTERY AND SECONDARY BATTERY MODULE

CROSS REFERENCE TO RELATED APPLICATION

This application claims priority to Japanese Patent Application No. 2020-046539 filed on Mar. 17, 2020, which is incorporated herein by reference in its entirety including the specification, claims, drawings, and abstract.

TECHNICAL FIELD

The present disclosure relates to a technique for a nonaqueous electrolyte secondary battery and to a secondary battery module.

BACKGROUND

A nonaqueous electrolyte secondary battery, such as a lithium ion secondary battery, typically includes an electrode body and electrolyte. The electrode body includes a positive electrode having a positive electrode active material layer, and a negative electrode having a negative electrode active material layer, in which these electrodes are laminated via a separator. Such a nonaqueous electrolyte secondary battery is, for example, a battery to be charged or discharged with charge carriers (for example, lithium ions) in the electrolyte moving back and forth between the respective electrodes.

For example, Patent Document 1 describes use of a negative electrode in a nonaqueous electrolyte secondary battery, the negative electrode including a negative electrode collector and a negative electrode active material layer, in which the negative electrode active material layer includes a first layer and a second layer sequentially formed from a side with the negative electrode collector, the first layer includes first carbon-based active material particles with a 10% proof stress of 3 MPa or less, and the second layer includes second carbon-based active material particles with a 10% proof stress of 5 MPa or greater. According to Patent Document 1, use of the negative electrode active material layer including the above-mentioned first layer and second layer enables provision of a nonaqueous electrolyte secondary battery superior in output characteristics.

CITATION LIST

Patent Literature

Patent Document 1: WO 2019/187537 A1

SUMMARY

As a safety evaluation test for evaluating the tolerance of a battery against internal short-circuiting, for example, a nailing test is available in which a battery is stabbed with a nail to simulate occurrence of internal short-circuiting to observe the amount of heat generation of the battery for safety evaluation of the battery. As for a nonaqueous electrolyte secondary battery including a negative electrode active material layer having a laminated structure including a first layer and a second layer, as is described in Patent Document 1, there is room for improvement, in that the amount of heat generation in the battery in a nailing test can be reduced.

In view of the above, it is an object of the present disclosure to reduce the amount of heat generation of a battery in a nailing test with respect to a nonaqueous electrolyte secondary battery and a secondary battery module, each including a negative electrode active material layer having a laminated structure including a first layer and a second layer.

According to one aspect of this disclosure, there is provided a secondary battery module including at least one nonaqueous electrolyte secondary battery, and an elastic body disposed together with the nonaqueous electrolyte secondary battery, for receiving a load from the nonaqueous electrolyte secondary battery in a direction in which the nonaqueous electrolyte secondary battery and the elastic body are disposed, wherein the nonaqueous electrolyte secondary battery includes an electrode body including a laminate of a positive electrode, a negative electrode, and a separator disposed between the positive electrode and the negative electrode, and an enclosure for storing the electrode body therein, the elastic body has a compressive elastic modulus of 5 MPa to 120 MPa, the positive electrode includes a positive electrode collector containing Al and an element other than Al, the positive electrode collector has a thermal conductive rate of 65 W/(m·K) to 150 W/(m·K), the negative electrode includes a negative electrode collector and a negative electrode active material layer including a first layer and a second layer sequentially formed from a side with the negative electrode collector, the first layer contains negative electrode active material particles containing first carbon-based active material particles with a 10% proof stress of 3 MPa or less, and the second layer contains negative electrode active material particles containing second carbon-based active material particles with a 10% proof stress of 5 MPa or greater.

According to another aspect of this disclosure, there is provided a nonaqueous electrolyte secondary battery including an electrode body including a laminate of a positive electrode, a negative electrode, and a separator disposed between the positive electrode and the negative electrode, an elastic body for receiving a load from the electrode body in a lamination direction of the electrode body, and an enclosure for storing the electrode body and the elastic body therein, wherein the elastic body has a compressive elastic modulus of 5 MPa to 120 MPa, the positive electrode includes a positive electrode collector containing Al and an element other than Al, the positive electrode collector has a thermal conductive rate of 65 W/(m·K) to 150 W/(m·K), the negative electrode includes a negative electrode collector and a negative electrode active material layer including a first layer and a second layer sequentially formed from a side with the negative electrode collector, and the first layer contains negative electrode active material particles containing first carbon-based active material particles with a 10% proof stress of 3 MPa or less, and the second layer contains negative electrode active material particles containing second carbon-based active material particles with a 10% proof stress of 5 MPa or greater.

According to one aspect of the present disclosure, it is possible to reduce the amount of heat generation of a battery in a nailing test.

BRIEF DESCRIPTION OF DRAWINGS

Embodiment(s) of the present disclosure will be described based on the following figures, wherein.

DESCRIPTION OF EMBODIMENTS

Figure 1:
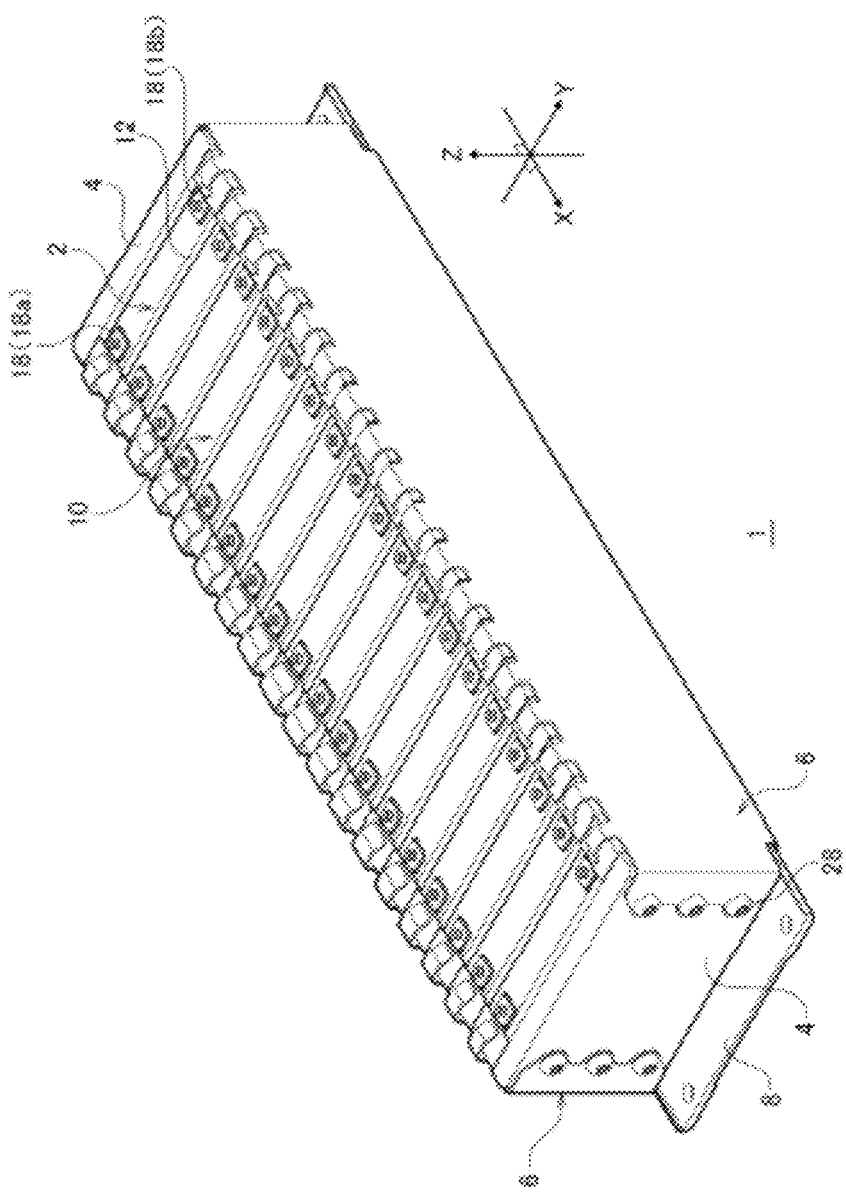
FIG. 1 is a perspective view of a secondary battery module according to an embodiment.

One example of an embodiment will now be described in detail. The drawings to be referred to in description of the embodiment are only schematically illustrated, and the dimensions and ratios of the structural components illustrated in the drawings may differ from those of the corresponding actual components.

Figure 2:
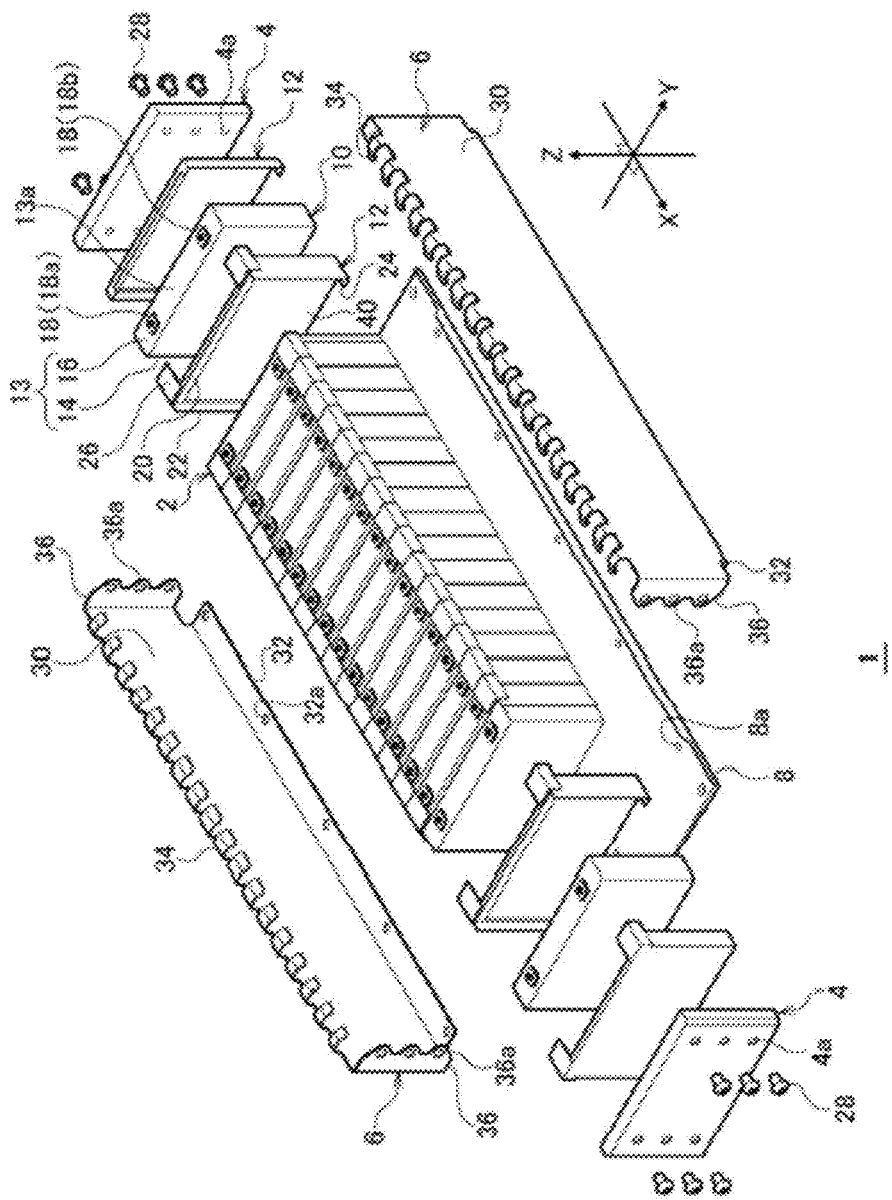
FIG. 2 is an exploded perspective view of the secondary battery module according to the embodiment.

FIG. 1 is a perspective view of a secondary battery module according to an embodiment. FIG. 2 is an exploded perspective view of the secondary battery module according to the embodiment. A secondary battery module 1 includes, as one example, a stacked body 2, a pair of binding members 6, and a cooling plate 8. The stacked body 2 includes a number of nonaqueous electrolyte secondary batteries 10, a number of insulation spacers 12, a number of elastic bodies 40, and a pair of end plates 4.

Each nonaqueous electrolyte secondary battery 10 is, for example, a chargeable/dischargeable secondary battery, such as a lithium ion secondary battery. A nonaqueous electrolyte secondary battery 10 in this embodiment is a so-called rectangular battery, and includes an electrode body 38 (refer to FIG. 3), electrolyte, and a flat rectangular parallelepiped enclosure 13. The enclosure 13 includes an outer can 14 and a sealing plate 16. The outer can 14 has a substantially rectangular opening on its one surface, so that the electrode body 38, the electrolyte, and so forth are inserted into the outer can 14 through the opening. The outer can 14 is desirably coated with an insulation film, not illustrated, such as a shrink tube. To the opening of the outer can 14, the sealing plate 16 is provided to cover the opening to thereby seal the outer can 14. The sealing plate 16 constitutes a first surface 13a of the enclosure 13. The sealing plate 16 is connected to the outer can 14, for example, by means of laser, friction stir joining, or brazing.

The enclosure 13 may be a cylindrical case, for example, and may be an outer body made of a laminated sheet including a metal layer and a resin layer.

Figure 3:
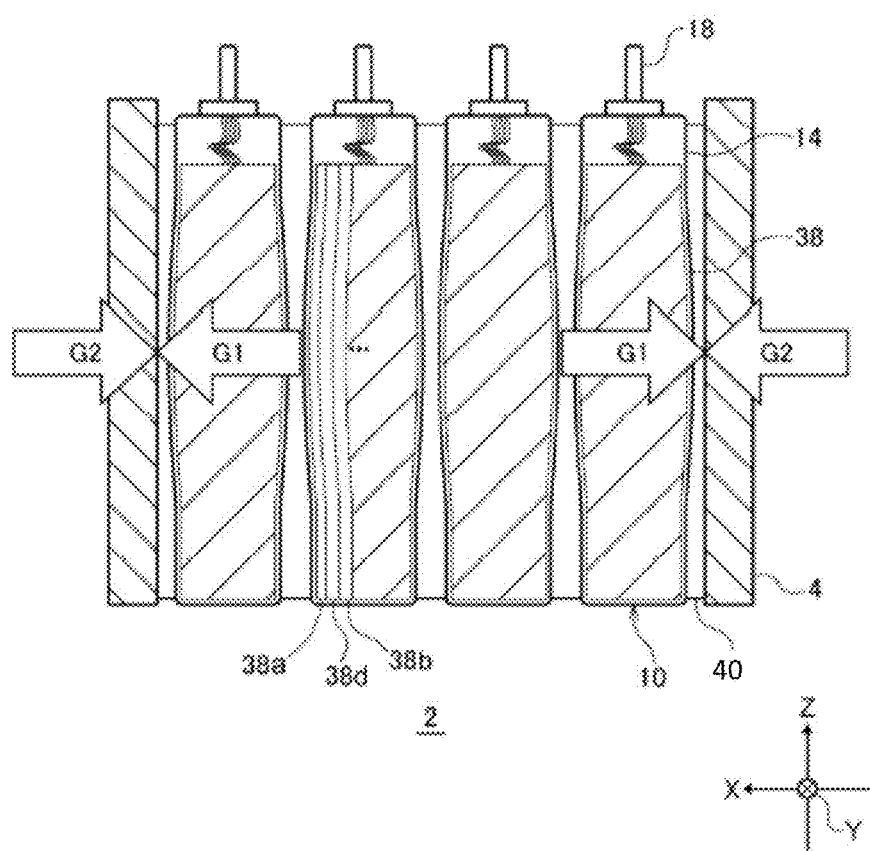
FIG. 3 is a schematic cross sectional view of the nonaqueous electrolyte secondary battery in expansion.

The electrode body 38 has a structure including a number of sheet positive electrodes 38a and a number of sheet negative electrodes 38b alternately laminated via separators 38d (refer to FIG. 3). Specifically, the positive electrode 38a, the negative electrode 38b, and the separator 38d are laminated in a first direction X. That is, the first direction X corresponds to the lamination direction of the electrode body 38. The electrodes disposed at the respective end sides of the electrode body 38 in the lamination direction are opposed to the respective longer lateral surfaces, to be described later, of the enclosure 13. Note that the illustrated first direction X, a second direction Y, and a third direction Z are directions orthogonal to one another.

The electrode body 38 may be a cylindrical winding electrode body formed by winding a laminate including a band-shaped positive electrode and a band-shaped negative electrode laminated via a separator. Alternatively, the electrode body 38 may be a flat winding electrode body formed by flattening a cylindrical winding electrode body. For a flat winding electrode body, a rectangular parallelepiped outer can is usable, whereas for a cylindrical winding electrode body, a cylindrical outer can is desirably used.

On the sealing plate 16; that is, on the first surface 13a of the enclosure 13, an output terminal 18 for electrical connection to the positive electrode 38a of the electrode body 38 is formed at a position closer to one end in the longitudinal direction, and an output terminal 18 for electrical connection to the negative electrode 38b of the electrode body 38 is formed at a position closer to the other end. Note that the output terminal 18 for connection to the positive electrode 38a will be hereinafter referred to as a positive electrode terminal 18a, and the output terminal 18 for connection to the negative electrode 38b as a negative electrode terminal 18b. In the case where no polarity distinction between the pair of output terminals 18 is necessary, the positive electrode terminal 18a and the negative electrode terminal 18b will be collectively referred to as output terminals 18.

The outer can 14 has a bottom surface opposed to the sealing plate 16. In addition, the outer can 14 has four lateral surfaces connecting the opening and the bottom surface. Two out of the four lateral surfaces are a pair of longer lateral surfaces connected to two respective opposed longer edges of the opening. Each longer lateral surface is a surface having the largest area, or the main surface, among the surfaces of the outer can 14. Each longer lateral surface is a lateral surface expanding in a direction intersecting the first direction X (for example, being orthogonal). Meanwhile, the two lateral surfaces other than the two longer lateral surfaces are a pair of shorter lateral surfaces connected to the respective shorter edges of the opening and those of the bottom surface of the outer can 14. The bottom surface, the longer lateral surfaces, and the shorter lateral surfaces of the outer can 14 respectively correspond to the bottom surface, the longer lateral surfaces, and the shorter lateral surfaces of the enclosure 13.

In the description of this embodiment, for convenience, the first surface 13a of the enclosure 13 is defined as the upper surface of the nonaqueous electrolyte secondary battery 10. In addition, the bottom surface of the enclosure 13 is defined as the bottom surface of the nonaqueous electrolyte secondary battery 10; the longer lateral surfaces of the enclosure 13 as the longer lateral surfaces of the nonaqueous electrolyte secondary battery 10; and the shorter lateral surfaces of the enclosure 13 as the shorter lateral surfaces of the nonaqueous electrolyte secondary battery 10. As to the secondary battery module 1, the surface on a side of the upper surface of the nonaqueous electrolyte secondary battery 10 is defined as the upper surface of the secondary battery module 1; the surface on a side of the bottom surface of the nonaqueous electrolyte secondary battery 10 as the bottom surface of the secondary battery module 1; and the surfaces on the respective sides of the shorter lateral surfaces of the nonaqueous electrolyte secondary battery 10 as the lateral surfaces of the secondary battery module 1. In addition, the direction toward the upper surface of the secondary battery module 1 is defined as the upward direction in the vertical direction; and the direction toward the bottom surface of the secondary battery module 1 as the downward direction in the vertical direction.

The number of nonaqueous electrolyte secondary batteries 10 are aligned in parallel at predetermined intervals such that the longer lateral surfaces of the adjacent nonaqueous electrolyte secondary batteries 10 are opposed to each other. In this embodiment, the output terminals 18 of the respective nonaqueous electrolyte secondary battery 10 are disposed directed in the same direction, although these may be disposed directed in different directions.

Two adjacent nonaqueous electrolyte secondary batteries 10 are disposed (stacked) such that the positive electrode terminal 18a of one nonaqueous electrolyte secondary battery 10 is disposed adjacent to the negative electrode terminal 18b of the other nonaqueous electrolyte secondary battery 10, and the positive electrode terminal 18a and the negative electrode terminal 18b are serially connected to each other via a busbar (not illustrated). Alternatively, the output terminals 18 of the same polarity of the number of adjacent nonaqueous electrolyte secondary batteries 10 may be connected in parallel via a busbar to thereby form a nonaqueous electrolyte secondary battery block, and the nonaqueous electrolyte secondary battery blocks may be serially connected to each other.

The insulation spacer 12 is disposed between two adjacent nonaqueous electrolyte secondary batteries 10 for electrical insulation between the two nonaqueous electrolyte secondary batteries 10. The insulation spacer 12 is made of insulation resin, for example. Examples of the resin for formation of the insulation spacer 12 include polypropylene, polybutylene terephthalate, and polycarbonate. The number of nonaqueous electrolyte secondary batteries 10 and the number of insulation spacers 12 are alternately stacked. The insulation spacer 12 is disposed also between the nonaqueous electrolyte secondary battery 10 and the end plate 4.

The insulation spacer 12 includes a planar portion 20 and a wall portion 22. The planar portion 20 intervenes between the opposed longer lateral surfaces of two adjacent nonaqueous electrolyte secondary batteries 10. This arrangement ensures insulation between the outer cans 14 of the adjacent nonaqueous electrolyte secondary batteries 10.

The wall portion 22 extends from the outer edge of the planar portion 20 in a direction in which the nonaqueous electrolyte secondary batteries 10 are aligned, and covers a part of the upper surface, the lateral surface, and a part of the bottom surface of the nonaqueous electrolyte secondary battery 10. This ensures some distance, for example, between the adjacent nonaqueous electrolyte secondary batteries 10 or between a nonaqueous electrolyte secondary battery 10 and the end plate 4 on the lateral side. The wall portion 22 has a notch 24 where the bottom surface of the nonaqueous electrolyte secondary battery 10 is exposed. In addition, the insulation spacer 12 has an urging force receiving portion 26 formed upward on each end portion of the insulation spacer 12 in the second direction Y.

The elastic bodies 40 are disposed in the first direction X together with the number of nonaqueous electrolyte secondary batteries 10. That is, the first direction X is the lamination direction of the electrode body 38, as described above, and also a direction in which the nonaqueous electrolyte secondary batteries 10 and the elastic bodies 40 are disposed, or a disposition direction. The elastic body 40 is shaped like a sheet, and intervenes, for example, between the longer lateral surface of each nonaqueous electrolyte secondary battery 10 and the planar portion 20 of each insulation spacer 12. The elastic body 40, disposed between two adjacent nonaqueous electrolyte secondary batteries 10, may be one sheet or a laminate including a number of sheets laminated. The elastic body 40 may be secured on the surface of the planar portion 20 with adhesive agent or the like. Alternatively, a recess may be formed on the planar portion 20, so that the elastic body 40 may be fit in the recess. Still alternatively, the elastic body 40 and the insulation spacer 12 may be formed integrally. Still alternatively, the elastic body 40 may serve also as the planar portion 20.

The number of nonaqueous electrolyte secondary batteries 10, insulation spacers 12, and elastic bodies 40, which are aligned in parallel to one another, are held between the pair of end plates 4 in the first direction X. Each end plate 4 is made of a metal plate or a resin plate, for example. Each end plate 4 has a screw hole 4a that penetrates the end plate 4 in the first direction X, so that a screw 28 is inserted into the screw hole 4a.

Each of the pair of binding members 6 is a longitudinal member whose longitudinal direction corresponds to the first direction X. The pair of binding members 6 are disposed opposed to each other in the second direction Y. Between the pair of binding members 6, the stacked body 2 is disposed. Each binding member 6 includes a main portion 30, a support portion 32, a number of urging portions 34, and a pair of fixture portions 36.

The main portion 30 is a rectangular portion extending in the first direction X. The main portion 30 extends parallel to the lateral surfaces of the respective nonaqueous electrolyte secondary batteries 10. The support portion 32 extends in the first direction X, and projects in the second direction Y from the lower end of the main portion 30. The support portion 32 is a plate member continuing in the first direction X, and supports the stacked body 2.

The number of urging portions 34 are connected to the upper end of the main portion 30, and project in the second direction Y. The support portion 32 is opposed to the urging portion 34 in the third direction Z. The number of urging portions 34 are disposed at predetermined intervals in the first direction X. Each of the urging portions 34 has a leaf spring shape, for example, and urges the nonaqueous electrolyte secondary batteries 10 toward the support portion 32.

Each of the pair of fixture portions 36 is a plate member formed on the respective end portion of the main portion 30 in the first direction X and projecting in the second direction Y. The pair of fixture portions 36 is opposed to each other in the first direction X. Each fixture portion 36 has a through hole 36a for insertion of a screw 28 therethrough. The pair of fixture portions 36 have the binding member 6 secured to the stacked body 2.

The cooling plate 8 is a mechanism for cooling the number of nonaqueous electrolyte secondary batteries 10. The stacked body 2, being bundled with the pair of binding members 6, is placed on the main surface of the cooling plate 8, and secured onto the cooling plate 8 with a fastening member (not illustrated), such as a screw, penetrating a through hole 32a of the support portion 32 and a through hole 8a of the cooling plate 8.

FIG. 3 is a schematic cross sectional view of nonaqueous electrolyte secondary batteries in expansion. In FIG. 3, a lower number of nonaqueous electrolyte secondary batteries 10 than the number of the nonaqueous electrolyte secondary batteries 10 actually provided are illustrated; the inside structure of the nonaqueous electrolyte secondary battery 10 is illustrated more simply; and the insulation spacer 12 is not illustrated. As illustrated in FIG. 3, each nonaqueous electrolyte secondary battery 10 incorporates the electrode body 38 (the positive electrode 38a, the negative electrode 38b, and the separator 38d). The outer can 14 of the nonaqueous electrolyte secondary battery 10 expands and shrinks due to expansion and shrinkage of the electrode body 38 through charging and discharging. Once the outer can 14 of each nonaqueous electrolyte secondary battery 10 expands, a load G1 directed outward in the first direction X is applied to the stacked body 2. That is, the elastic body 40, disposed together with the nonaqueous electrolyte secondary battery 10, receives a load directed in the first direction (or the disposition direction of the nonaqueous electrolyte secondary battery 10 and the elastic body 40, which is also the lamination direction of the electrode body 38) from the nonaqueous electrolyte secondary battery 10. Meanwhile, a load G2 corresponding to the load G1 is applied to the stacked body 2 by the end plate 4.

Figure 4:
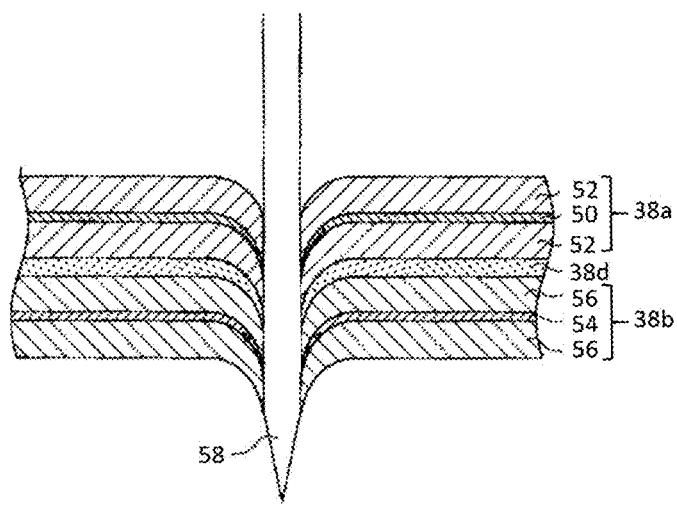
FIG. 4 is a schematic cross sectional view illustrating the condition of an electrode body in a nailing test.

FIG. 4 is a schematic cross sectional view of an electrode body in a nailing test. As illustrated in FIG. 4, the positive electrode 38*a* includes a positive electrode collector 50 and a positive electrode active material layer 52 formed on the positive electrode collector 50, while the negative electrode 38*b* includes a negative electrode collector 54 and a negative electrode active material layer 56 formed on the negative electrode collector 54. Note that the negative electrode active material layer 56 includes a first layer 56*a* and a second layer 56*b* sequentially formed from a side with the negative electrode collector 54, as to be described later (refer to FIG. 7). As illustrated in FIG. 4, when a nonaqueous electrolyte secondary battery is stabbed with a nail 58 in a nailing test until the nail 58 fully penetrates the positive electrode 38*a* and the separator 38*d* to reach the negative electrode 38*b*, internal short-circuiting is caused, and a short-circuit current flows. This leads to heat generation in the nonaqueous electrolyte secondary battery.

Here, the positive electrode collector 50 in this embodiment is a low thermal conductive Al-containing positive electrode collector that contains Al and an element other than Al and whose thermal conductive rate is 65 W/(m·K) to 150 W/(m·K). In such a low thermal conductive Al-containing positive electrode collector, as heat likely concentrates in a short-circuited portion (a portion of the positive electrode collector in direct contact with the nail), a short-circuited portion of the positive electrode collector 50 melts acceleratingly. This leads to a shorter period of time after occurrence of internal short-circuiting until fusing of the positive electrode collector 50 in a nailing test.

The elastic body 40 in this embodiment is an elastic body having a compressive elastic modulus of 5 MPa to 120 MPa. Since such an elastic body having a compressive elastic modulus of 5 MPa to 120 MPa modifies the load G1 directed outward in the first direction X and the load G2 corresponding to the load G1, excessive approach between the positive electrode 38*a* and the negative electrode 38*b* is prevented. This prevents increase in area of a short-circuited portion of the positive electrode collector 50 in a nailing test, as compared with a case in which the above-mentioned low thermal conductive Al-containing positive electrode collector is used but an elastic body with a compressive elastic modulus of 5 MPa to 120 MPa is not disposed or an elastic body with a compressive elastic modulus in excess of 120 MPa is disposed. Hence, the period of time after occurrence of internal short-circuiting until fusing of the positive electrode collector 50 is further shortened in a nailing test. Note here that a nonaqueous electrolyte secondary battery including the negative electrode active material layer 56 having a laminated structure including the first layer 56*a* and the second layer 56*b*, to be described later, prevents drop in output of a battery in a charge/discharge cycle, but still causes large heat generation due to a large short-circuiting current when internal short-circuiting occurs in a nailing test. In such a nonaqueous electrolyte secondary battery 10 as well, use of the elastic body 40 having the above-mentioned compressive elastic modulus and the positive electrode collector 50 having the above-mentioned thermal conductive rate shortens the period of time after occurrence of internal short-circuiting until fusing of the positive electrode collector 50 in a nailing test, and thus reduces the amount of heat generation in a nailing test.

Figure 5:
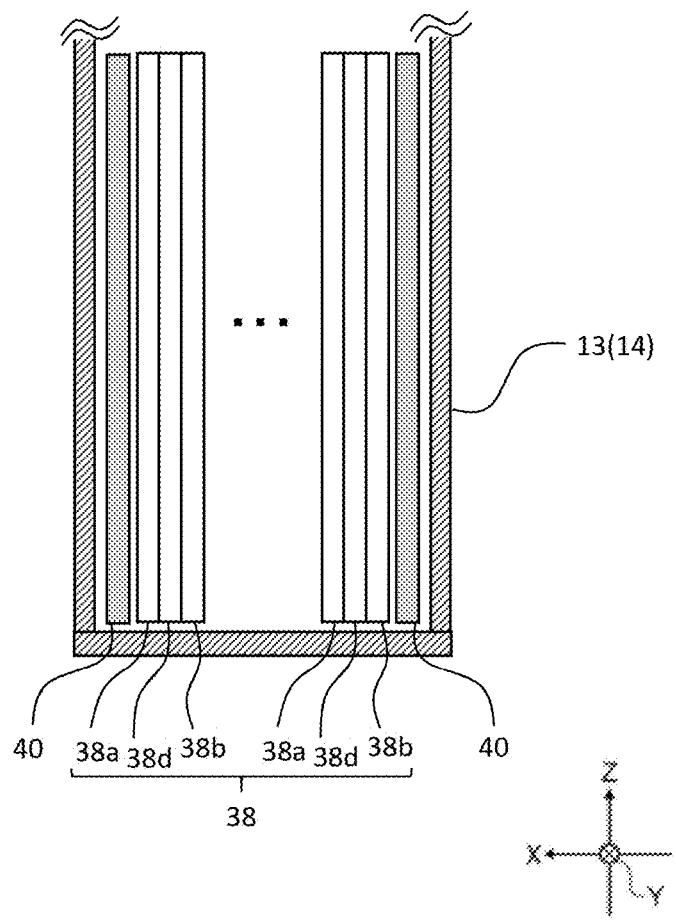
FIG. 5 is a schematic cross sectional view of an elastic body disposed in an enclosure.

FIG. 5 is a schematic cross sectional view of an elastic body that is disposed inside an enclosure. The elastic body 40 is not necessarily disposed along with the nonaqueous electrolyte secondary battery 10, as described above; that is, disposed outside the enclosure 13, but can be disposed inside the enclosure 13. The elastic body 40 illustrated in FIG. 5 is disposed on each end side of the electrode body 38 in the lamination direction (the first direction X) of the electrode body 38, and held between the inside wall of the enclosure 13 and the electrode body 38.

When the electrode body 38 expands through charging and discharging of the nonaqueous electrolyte secondary battery 10, a load directed outward in the first direction X is generated in the electrode body 38. That is, the elastic body 40 inside the enclosure 13 receives a load directed in the first direction (the lamination direction of the electrode body 38) from the electrode body 38. Hence, provided that the elastic body 40 has a compressive elastic modulus of 5 MPa to 120 MPa and that the positive electrode collector 50 is a low thermal conductive Al-containing positive electrode collector containing Al and an element other than Al and having a thermal conductive rate of 65 W/(m·K) to 150 W/(m·K), the same operational effect as that described above can be obtained.

Figure 6:
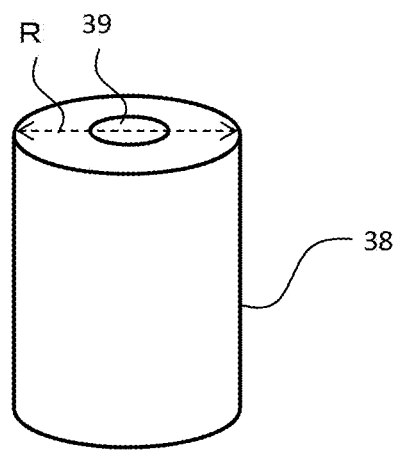
FIG. 6 is a schematic perspective view of a cylindrical winding electrode body.

The elastic body 40 in the enclosure 13 can be disposed anywhere, provided that the elastic body 40 can receive a load from the electrode body 38 in the lamination direction of the electrode body 38. For example, in the case where the electrode body 38 is a cylindrical winding electrode body 38 illustrated in FIG. 6, for example, the elastic body 40 may be disposed at a winding core portion 39 of the cylindrical winding electrode body 38. Note that the lamination direction of the cylindrical winding electrode body 38 corresponds to the diameter direction (R) of the electrode body 38. As the electrode body 38 expands or shrinks, a load directed in the lamination direction (the diameter direction (R) of the electrode body 38) is generated with respect to the electrode body 38, and the elastic body 40 inside the winding core portion 39 receives the load in the lamination direction of the electrode body 38. In the case where a number of electrode bodies 38 are disposed inside the enclosure 13, which is not described by reference to the drawings, the elastic body 40 may be disposed between adjacent electrode bodies 38. In the case of a flat winding electrode body 38 as well, an elastic body may be similarly disposed at the middle of the electrode body.

The positive electrode 38*a*, the negative electrode 38*b*, the separator 38*d*, the elastic body 40, and the electrolyte will now be described in detail.

The positive electrode 38*a* includes the positive electrode collector 50, and the positive electrode active material layer 52 formed on the positive electrode collector 50. The positive electrode collector 50 contains Al and an element other than Al and has a thermal conductive rate in the range of 65 W/(m·K) to 150 W/(m·K). Al and the element other than Al may or may not be alloyed.

The Al content of the positive electrode collector 50 is preferably in excess of 50 wt %, more preferably 75 wt % or greater, and further preferably 90 wt % or greater, for example, in view of prevention of increase of the resistance value of the positive electrode collector 50. The upper limit of the Al content of the positive electrode collector 50 is, for example, 98 wt % or less.

The element other than Al contained in the positive electrode collector 50 can be any element, provided that the element allows adjustment of the thermal conductive rate into the above-described range. Examples of the element include Mg, Si, Sn, Cu, Zn, and Ge. Among these elements, Mg, in particular, is preferable in view of easiness in adjustment of the thermal conductive rate of the positive electrode collector 50. The Mg content of the positive electrode collector 50 is preferably 1.5 wt % or greater, and more preferably 3 wt % or greater, in view of adjustment of the thermal conductive rate of the positive electrode collector 50 to 150 W/(m·K) or less. The higher the Mg content of the positive electrode collector 50, the harder the positive electrode collector 50. In general, with a harder positive electrode collector, in the case of a nonaqueous electrolyte secondary battery employing a flat winding electrode body, for example, expansion and shrinkage of the electrode body through charging and discharging leads to application of a stress to a corner portion (where the electrode and the separator are curved) of a flat winding electrode body, which may break the positive electrode collector at a corner portion of the electrode body. In this embodiment, however, since the elastic body 40 of 5 MPa to 120 MPa modifies the stress applied to the corner portion of the flat winding electrode body, breakage of the positive electrode collector 50 can be prevented despite increase of the Mg content of the positive electrode collector 50. The upper limit of the Mg content of the positive electrode collector 50 is preferably less than 50 wt %, for example, more preferably 10 wt % or less, and further preferably is 6 wt % or less in consideration of the resistance value of the positive electrode collector 50.

While an acceptable thermal conductive rate of the positive electrode collector 50 is in the rage of 65 W/(m·K) to 150 W/(m·K), a preferred range of the thermal conductive rates is a range from 85 W/(m·K) to 130 W/(m·K), and more preferred is a range from 95 W/(m·K) to 120 W/(m·K), in view of further reduction in amount of heat generation of a battery in a nailing test.

<Method for Measuring Thermal Conductive Rate>

Thermal diffusivity, specific heat, and density of the positive electrode collector 50 are measured using the following method, and then substituted into the expression (1) below to obtain the thermal conduction rate (W/m·K) of the positive electrode collector 50.

thermal diffusivity: measured at 25° C., using a Xenon Flash Analyzer (registered trademark: LFA 467HT Hyper Flash, manufactured by Netzsch Japan K.K.).
specific heat: measured through comparison with sapphire reference material, using a differential scanning calorimeter (DSC).
density: measured based on Archimedes' principle.

$$\text{thermal conductive rate} = (\text{thermal diffusivity}) \times (\text{specific heat}) \times (\text{density}) \quad (1)$$

The positive electrode collector 50 preferably has a Young's modulus of 45 kN/mm² to 73.5 kN/mm², for example, in view of prevention of breakage of the positive electrode collector 50 at a corner portion of a flat winding electrode body due to charging and discharging. Young's modulus is measured under a temperature condition of 25° C. in a tensile test (for example, using a tensile and compression testing machine Technograph TG-2 kN, manufactured by Minebea Mitsui Inc.).

The positive electrode collector 50 preferably has a liquidus temperature of 650° C. or lower, for example, in view of prompt melting in a nailing test and effective reduction of the amount of heat generation in a battery. The lower limit of the liquidus temperature of the positive electrode collector 50 is, for example, 450° C. or greater. Note that liquidus temperature is the temperature at which solidus begins to be generated from liquidus. Liquidus temperature is obtained in differential scanning calorimetry (DSC).

The positive electrode active material layer 52 contains a positive electrode active material. The positive electrode active material layer 52 preferably contains an electrically conductive material and a binding agent, besides the positive electrode active material. The positive electrode active material layer 52 is preferably provided on the respective surfaces of the positive electrode collector 50.

Examples of a usable positive electrode active material include lithium transition metal composite oxides. Examples of the metal element contained in the lithium transition metal composite oxides include Ni, Co, Mn, Al, B, Mg, Ti, V, Cr, Fe, Cu, Zn, Ga, Sr, Zr, Nb, In, Sn, Ta, and W. Among these, at least one of Ni, Co, and Mn is preferably contained. Examples of the composite oxide include a lithium transition metal composite oxide containing Ni, Co, and Mn, and a lithium transition metal composite oxide containing Ni, Co, and Al.

Examples of the electrically conductive member include carbonaceous materials, such as carbon black, acetylene black, Ketjen black, and graphite. Examples of the binding agent include fluorine resins, such as polytetrafluoroethylene (PTFE), and polyvinylidene difluoride (PVdF), polyacrylonitrile (PAN), polyimide resins, acrylic resins, and polyolefin resins. These resins may be used together with, for example, cellulose derivatives, such as carboxymethyl cellulose (CMC) or salts thereof, or polyethylene oxide (PEO).

The positive electrode 38a can be formed, for example, by applying a positive electrode mixture slurry containing a positive electrode active material, an electrically conductive material, and a binding agent onto the positive electrode collector 50, then drying and rolling the resultant coating film to thereby form a positive electrode active material layer 52 on the positive electrode collector 50.

Figure 7:
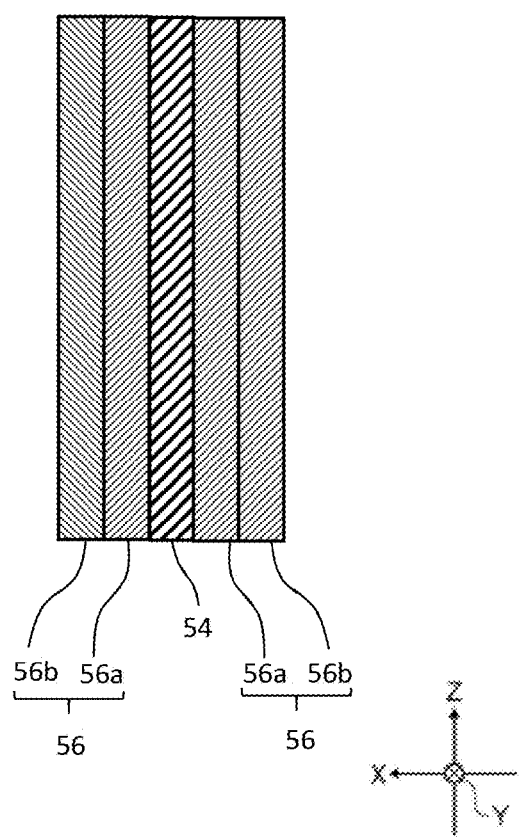
FIG. 7 is a schematic cross sectional view of a negative electrode.

FIG. 7 is a schematic cross sectional view of a negative electrode. As illustrated in FIG. 7, the negative electrode 38b includes the negative electrode collector 54, and the negative electrode active material layer 56 including the first layer 56a and the second layer 56b sequentially formed from a side with the negative electrode collector 54. For the negative electrode collector 54, foil of a metal that is stable in the potential range of the negative electrode 38b or a film having the metal disposed on its front layer is used. Examples of the material include copper. The negative electrode active material layer 56 (the first layer 56a and the second layer 56b) is preferably formed on the respective surfaces of the negative electrode collector 54.

The first layer 56a contains negative electrode active material particles P1, while the second layer 56b contains negative electrode active material particles P2. The first layer 56a and the second layer 56b preferably contain a binding agent, for example. Examples of the binding agent include the same binding agent as that contained in the positive electrode active material layer 52. The thickness of the negative electrode active material layer 56 is, for example, 20 μm to 120 μm on one side of the negative electrode collector 54. The thickness of the first layer 56a is preferably 30 to 80% that of the negative electrode active material layer 56, and more preferably is 50 to 70%. The thickness of the second layer 56*b* is preferably 20 to 70% that of the negative electrode active material layer 56, and more preferably is 30 to 50%. Note that the negative electrode active material layer 56 is not limited to those which include solely the first layer 56*a* and the second layer 56*b*, but may additionally include a third layer.

The negative electrode 38*b* is made, for example, using a first negative electrode mixture slurry containing negative electrode active material particles P1 and a binding agent, and a second negative electrode mixture slurry containing negative electrode active material particles P2 and a binding agent. Specifically, the first negative electrode mixture slurry is applied to a surface of the negative electrode collector 54, and the resultant coating film is dried. Thereafter, the second negative electrode mixture slurry is applied onto the first coating film made of the first negative electrode mixture slurry, and the resultant second coating film is dried. This provides the negative electrode 38*b* having the negative electrode active material layer 56 including the first layer 56*a* and the second layer 56*b*, formed on the negative electrode collector 54.

The negative electrode active material particles P1 contained in the first layer 56*a* contain first carbon-based active material particles with a 10% proof stress of 3 MPa or less (hereinafter referred to as carbon-based active material particles A). Meanwhile, the negative electrode active material particles P2 contained in the second layer 56*b* contain second carbon-based active material particles with a 10% proof stress of 5 MPa or greater (hereinafter referred to as carbon-based active material particles B). The carbon-based active material particles A, B are particles made of carbonaceous material, and preferably contain graphite as a main component. Examples of the graphite include natural graphite, such as flaky graphite, lump graphite, and earthy graphite, and artificial graphite, such as lump artificial graphite and graphitized mesophase carbon microbeads.

The carbon-based active material particles A are soft particles with a 10% proof stress of 3 MPa or less. Meanwhile, the carbon-based active material particles B are hard particles with a 10% proof stress of 5 MPa or greater. Forming the negative electrode 38*b* so as to have a laminated structure including the second layer 56*b* containing the carbon-based active material particles B disposed on a side closer to the surface of the negative electrode 38*b* and the first layer 56*a* containing the carbon-based active material particles A disposed on a side closer to the negative electrode collector 54 prevents, for example, disconnection of the electrically conductive path of the negative electrode active material layer 56, and, moreover, increases permeability of the electrolyte into the negative electrode active material layer 56. Hence, it is expected that drop in output of a battery in a charge/discharge cycle is prevented.

Note that, in this specification, a 10% proof stress refers to a stress caused when carbon-based active material particles A, B are compressed by 10 vol %. A 10% proof stress is measurable with respect to one carbon-based active material particles A, B with a micro compression testing machine (MCT-211 manufactured by Shimazu Corporation) or the like. For the measurement, particles each having a particle diameter equal to the particle diameter D5 of each carbon-based active material particles A, B are used.

Although the carbon-based active material particles A contains substantially no amorphous component (amorphous carbon), the carbon-based active material particles B preferably contain amorphous component. Specifically, the carbon-based active material particles B may contain amorphous component in an amount of 1 to 5 wt %. In this case, a 10% proof stress of 5 MPa or greater can be readily obtained. The amount of amorphous component contained in the carbon-based active material particles A is, for example, 0.1 to 2 wt %, and is preferably smaller than that in the carbon-based active material particles B.

The amorphous component (amorphous carbon) consists of carbon atoms in which a graphite crystalline structure does not develop; that is, carbon atoms in the state of an amorphous or microcrystal random layer structure. Specifically, the amorphous component refers to a component whose d (002) lattice spacing by X-ray diffraction is 0.342 nm or greater. Specific examples of the amorphous component include hard carbon (hardly graphitizable carbon), soft carbon (easily graphitizable carbon), carbon black, carbon fiber, and activated carbon. The amorphous component is obtained through carbonization treatment with resin or resin composition, for example. Examples of raw materials usable in the amorphous component are phenolic thermoset resins, thermoplastic resins such as polyacrylonitrile, and petroleum-based or coal-derived tar or pitch.

An amorphous component is preferably present in a state adhering onto a surface of a graphite-based carbon. Note here that being adhering refers to being chemically and/or physically bonded, and to a state in which amorphous component is not released from a surface of the graphite-based carbon when the active material particles are agitated in water or organic solvent. The physical properties of the amorphous component and the amount of adhering amorphous component are adjustable, for example, by changing the kind and/or amount of the raw material (such as petroleum-based or coal-derived tar or pitch), and/or the temperature at or a period of time of carbonization treatment with the raw material.

In view of readiness in obtaining a 10% proof stress of 5 MPa or greater, for example, the carbon-based active material particles B are preferably particles each including a core portion having voids, and a shell portion disposed covering the core portion. The core portion desirably has a structure consisting of graphite and amorphous carbon and having voids inside. The shell portion preferably has a structure consisting of amorphous carbon and having a thickness of 50 nm or greater. The weight ratio of the core portion and the shell portion is desirably 99:1 to 95:5. The porosity of the shell portion is preferably lower than that of the core portion. That is, the porosity of the core portion is desirably 1 to 5%, while that of the shell portion is 0.01 to 1%.

For example, the core portion is formed by mixing graphite and a graphitable binder, then heating the mixture to 500 to 3000° C. under an inert gas atmosphere or a nonoxidizing atmosphere, and applying powder-forming, such as crushing, cracking, sorting, spheroidizing, to the carbonized material. Examples of the graphite include natural graphite and artificial graphite. The average partial diameter of the graphite is preferably 10 μm or less, more preferably 5 μm or less. Examples of the graphitable binder include coal-derived, petroleum-based, or artificial pitch and tar, thermoplastic resins, and thermoset resins. For void formation, addition of an additive with a low residual carbon rate is preferred. Graphite and binder can be mixed at any ratio without limitation, while the ratio between the residual carbon of the binder component and the graphite is preferably 1:99 to 30:70. For example, a shell portion can be formed, for example, using a CVD method with acetylene or methane, or a manner of mixing coal pitch, petroleum pitch, phenol resins, or the like, and the carbonaceous material of the core portion before thermal treatment. The above-described formation method can readily provide carbon-based active material particles with a 10% proof stress of 5 MPa or greater.

The negative electrode active material particles P1 contained in the first layer 56a may include carbon-based active material particles B, besides the carbon-based active material particles A, or any negative electrode active materials other than the carbon-based active material particles A, B, within a range not impairing the object of this disclosure. The content of the carbon-based active material particles A in the first layer 56a is desirably 50 wt % or greater, for example, relative to the total amount of the negative electrode active material particles P1. In addition, the negative electrode active material particles P2 contained in the second layer 56b may include carbon-based active material particles A besides the carbon-based active material particles B, or any other negative electrode active materials besides the carbon-based active material particles A, B, in a range not impairing the object of the present disclosure. The content of the carbon-based active material particles B in the second layer 56b is desirably 50 wt % or greater, for example, relative to the total amount of the negative electrode active material particles P2.

Examples of the negative electrode active materials other than the carbon-based active material particles A, B include metals that are alloyed with lithium, such as silicon (Si), tin (Sn), for example, or alloys or compounds that contain metal elements, such as Si, Sn, or the like. Among these, in view of high capacity of a battery, compounds containing Si are preferred. In the case where the negative electrode active material layer 56 contains negative electrode active materials other than the carbon-based active material particles A, B, the content of the negative electrode active materials other than the carbon-based active material particles A, B preferably holds "the first layer 56a>the second layer 56b" in view of prevention of drop in output of a battery in a charge/discharge cycle, and the second layer 56b preferably contains substantially no such materials.

A preferred compound containing Si is an Si oxide, expressed as $SiO_x$ ($0.5 \leq x \leq 1.6$), for example. An Si oxide expressed as SiOx has a structure, for example, in which Si microparticles are dispersed in an amorphous Sift matrix. Further, the compound containing Si may be a compound expressed as $Li_{2y}SiO_{(2+y)}$ ($0<y<2$) with Si microparticles dispersed in a lithium silicate phase.

It is preferred that an electrically conductive film made of highly electrically conductive material is formed on the surface of the particles of the compound containing Si. Examples of the material of the electrically conductive film include at least one kind of material selected from among carbonaceous materials, metals, and metal compounds. Among these, carbonaceous materials such as amorphous carbon are preferred. A carbon film can be formed, for example, using a CVD method using acetylene or methane, for example, or a manner of mixing coal pitch, petroleum pitch, phenol resins, or the like, and a silicon-based active material before thermal treatment. Alternatively, an electrically conductive filler, such as carbon black, may be adhered on the surface of the particles of a compound containing Si with a binding agent to thereby form an electrically conductive film.

The negative electrode active material particles P2 contained in the second layer 56b preferably have a BET specific surface area smaller than that of the negative electrode active material particles P1 contained in the first layer 56a. This improves, for example, permeability of the electrolyte into the negative electrode active material layer 56 and retention therein, which in some cases prevents drop in output of a battery in a charge/discharge cycle. The BET specific surface area of the negative electrode active material particles P2 is preferably 0.5 m$^2$/g or greater to less than 3.5 m$^2$/g, for example, and more preferably is 0.75 m$^2$/g or greater to 1.9 m$^2$/g or less. Further, the BET specific surface area of the negative electrode active material particles P1 is preferably 3.5 m$^2$/g or greater to 5 m$^2$/g or less, and more preferably is 2.5 m$^2$/g or greater to 4.5 m$^2$/g or less. BET specific surface area is measured with a BET method, using a conventionally known specific surface area measuring device (for example, Macsorb (registered trademark) HM model-1201 manufactured by Mountech Co., Ltd.).

The porosity of the second layer 56b is preferably greater than that of the first layer 56a. This improves permeability of the electrolyte into the negative electrode active material layer 56 and retention therein, for example, which in some cases prevents drop in output of a battery in a charge/discharge cycle.

Note here that the porosities of the first layer 56a and the second layer 56b are two-dimensional values obtained based on the percentage of the area of the voids between the respective particles in each layer relative to the cross sectional area of the layer, and can be obtained by following the procedure below, for example.

(1) A part of a negative electrode is cut off, and treated with an Ion Milling System (for example, IM4000 manufactured by Hitachi High-Tech Corporation) to expose a cross section of the negative electrode active material layer 56.

(2) Using a scanning electron microscope, a backscattered electron image of the cross section of the first layer 56a of the exposed negative electrode active material layer 56 is captured.

(3) The image of the cross section captured as above is taken into a computer, and binarized with an image analysis software (for example, ImageJ prepared by National Institutes of Health) to obtain a binarized image in which the cross sections of the particles in the cross sectional image are colored black and those of the voids between particles are colored white.

(4) To obtain the porosity of the first layer 56a, the area of the voids between the particles in a measurement range (for example, 50 μm×50 μm) is calculated from the binarized image. Assuming that the measurement area as a cross sectional area (2500 μm$^2$=50 μm×50 μm) of the first layer 56a, the porosity of the first layer 56a (the area of the voids between particles×100/the cross sectional area of the negative electrode active material layer 56) is calculated from the calculated area of the voids between the particles. The porosity of the second layer 56b is similarly measured.

Examples of a method for adjusting the porosities of the first layer 56a and the second layer 56b include a method for adjusting a rolling force to be applied to the first coating film and the second coating film in formation of the negative electrode active material layer 56.

As the separator 38d, for example, a porous sheet having ion permeability and insulation is used. Specific examples of the porous sheet include porous thin films, woven fabrics, and nonwoven fabrics. Examples of materials usable in the separator 38d include olefine-based resins, such as polyethylene and polypropylene, and cellulose. The separator 38d may be a laminate including a cellulose fiber layer and a thermoplastic resin fabric layer, such as olefine-based resins. Alternatively, the separator 38d may be a multiple layer separator including a polyethylene layer and a polypropylene layer. The surface of the separator 38d may be coated with such a material as aramid-based resins, ceramic, or the like.

Examples of raw materials usable in the elastic body 40 are thermoset elastomers, such as natural rubbers, urethane rubbers, silicone rubbers, and fluorine rubbers, and thermoplastic elastomers, such as polystyrene, olefin, polyurethane, polyester, and polyamide. These materials may be foamed. Other examples include heat insulators carrying a spongiose member, such as silica xerogel.

In this embodiment, it is preferred that the compressive elastic moduli of the negative electrode active material layer 56, the separator 38d, and the elastic body 40 are defined as follows. That is, preferably, the compressive elastic modulus of the separator 38d is lower than that of the negative electrode active material layer 56, and that of the elastic body 40 is lower than that of the separator 38d. That is, the compressive elastic moduli hold the relationship "the negative electrode active material layer 56>the separator 38d>the elastic body 40". Thus, among the above-mentioned, the negative electrode active material layer 56 is least readily deformable, while the elastic body 40 is most readily deformable. Defining the compressive elastic moduli of the respective members as described above improves permeability of the electrolyte into the negative electrode active material layer 56 and retainment therein, which in some cases prevents drop in output of a battery in a charge/discharge cycle. The compressive elastic modulus of the separator 38d is preferably, for example, a compressive elastic modulus 0.3 to 0.7 times that of the negative electrode active material layer 56, and more preferably is 0.4 to 0.6 times. The compressive elastic modulus of the elastic body 40 is within the range of 5 MPa to 120 MPa, and preferably is within the range of 25 MPa to 100 MPa.

The compressive elastic modulus is calculated by dividing the deformed amount of a sample in the thickness direction upon application of a predetermined load to the sample in the thickness direction, by a compressed area, and then multiplying by the thickness of the sample. That is, the compressive elastic modulus is calculated with an expression of "compressive elastic modulus (MPa)=load (N)/compressed area $(mm^2)$×(deformed amount of a sample (mm)/thickness of the sample (mm))". Note that in measurement of the compressive elastic modulus of the negative electrode active material layer 56, the compressive elastic modulus of the negative electrode collector 54 is measured, and the compressive elastic modulus of the negative electrode 38b including the negative electrode active material layer 56 formed on the negative electrode collector 54 is measured. Then, based on the compressive elastic moduli of the negative electrode collector 54 and the negative electrode 38b, the compressive elastic modulus of the negative electrode active material layer 56 is calculated. Alternatively, in the case where the compressive elastic modulus of the negative electrode active material layer 56 is obtained from the formed negative electrode 38b, the compressive elastic modulus of the negative electrode 38b is measured; the compressive elastic modulus of the negative electrode collector 54, or the remaining when the negative electrode active material layer 56 is taken off from the negative electrode 38b, is measured; and the compressive elastic modulus of the negative electrode active material layer 56 is calculated, based on these measured compressive elastic moduli.

Examples of a method for adjusting the compressive elastic modulus of the negative electrode active material layer 56 include a method for adjusting the rolling force to be applied to the negative electrode mixture slurry formed on the negative electrode collector 54. Alternatively, for example, changing the material and physical properties of the negative electrode active material enables adjustment of the compressive elastic modulus of the negative electrode active material layer 56. Note that adjustment of the compressive elastic modulus of the negative electrode active material layer 56 is not limited to the above-described method. The compressive elastic modulus of the separator 38d is adjusted, for example, through selection of the material, control of the pore rate and/or opening diameter of the material, or the like, while the compressive elastic modulus of the elastic body 40 is adjusted, for example, through selection of the material and control of the shape of the material.

The elastic body 40 may have a consistent compressive elastic modulus over its one surface. Alternatively, the elastic body 40 may have a structure in which easiness of deformation varies over a surface, as to be described later.

Figure 8:
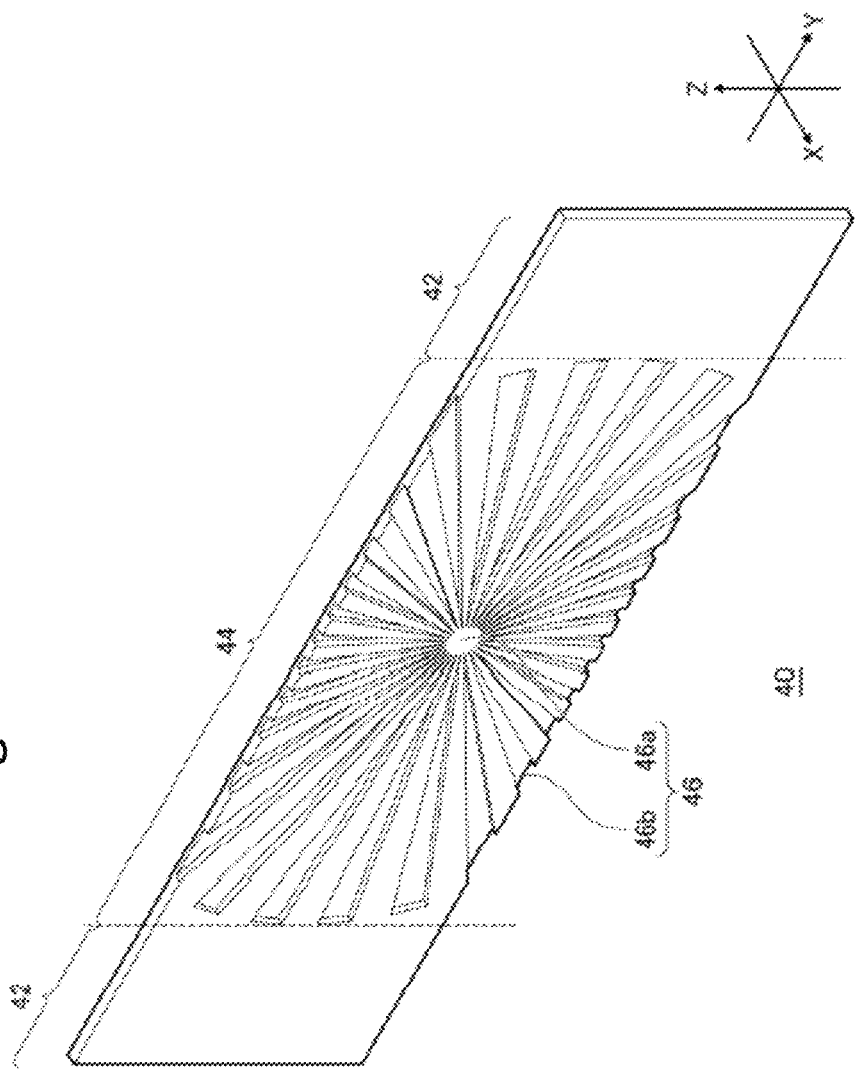
FIG. 8 is a schematic perspective view of one example of an elastic body.

FIG. 8 is a schematic perspective view of one exemplary elastic body. The elastic body 40 illustrated in FIG. 8 includes a soft portion 44 and a hard portion 42. The hard portion 42 is positioned closer to the outer edge of the elastic body 40 than is the soft portion 44. The elastic body 40 illustrated in FIG. 8 has a structure in which the hard portion 42 is disposed on each end of the elastic body 40 in the second direction Y, and the soft portion 44 is disposed between the two hard portions 42. The soft portion 44 is preferably disposed overlapping the middle portion of the longer lateral surface of the enclosure 13 when viewed in the first direction X, and also the middle portion of the electrode body 38. The hard portion 42 is preferably disposed overlapping the outer edge of the longer lateral surface of the enclosure 13, and also the outer edge of the electrode body 38.

As described above, the nonaqueous electrolyte secondary battery 10 expands mainly due to expansion of the electrode body 38. Specifically, the electrode body 38 expands to a large degree in a portion closer to its middle. That is, the electrode body 38 is displaced a greater distance in the first direction at a position closer to its middle, and a smaller distance at a position more outward from the middle toward the outer edge. Following this displacement of the electrode body 38, the nonaqueous electrolyte secondary battery 10 is displaced a greater distance in the first direction X in a position closer to the middle of the longer lateral surface of the enclosure 13, and a smaller distance in a position further outward from the middle of the longer lateral surface of the enclosure 13 toward the outer edge of the longer lateral surface of the enclosure 13. Thus, in the case where the elastic body 40 illustrated in FIG. 8 is disposed inside the enclosure 13, the elastic body 40 can receive a larger load generated due to large displacement of the electrode body 38 with the soft portion 44, and a smaller load generated due to small displacement of the electrode body 38 with the hard portion 42. Further, in the case where the elastic body 40 illustrated in FIG. 8 is disposed outside the enclosure 13, the elastic body 40 can receive a large load generated due to large displacement of the nonaqueous electrolyte secondary battery 10 with the soft portion 44, and a small load generated due to small displacement of the nonaqueous electrolyte secondary battery 10 with the hard portion 42.

The elastic body 40 illustrated in FIG. 8 includes a recessed portion 46 that is recessed in the first direction X, leaving a non-recessed portion adjacent to the recessed portion 46. The non-recessed portion can be partially displaced toward the recessed portion 46 upon receipt of a load from the nonaqueous electrolyte secondary battery 10 or the electrode body 38. That is, formation of the recessed portion 46 makes the non-recessed portion readily deformable. In view of the above, in order to make the soft portion 44 more readily deformable than the hard portion 42, it is preferred that the percentage in area of the recessed portion 46 occupied in the soft portion 44 when viewed in the first direction X is larger than that of the recessed portion 46 occupied in the hard portion 42. Note that, although in the elastic body 40 illustrated in FIG. 8 the recessed portion 46 is formed only in the soft portion 44, the recessed portion 46 may be disposed in the hard portion 42.

The recessed portion 46 includes a core portion 46a and a number of linear portions 46b. The core portion 46a is round and disposed at the middle of the elastic body 40 when viewed in the first direction X. The number of linear portions 46b extend radially from the core portion 46a. The radially extending linear portions 46b lead to a higher percentage of the linear portions 46b occupied in an area closer to the core portion 46a, leaving a smaller non-recessed portion there. Hence, the non-recessed portion is more readily deformable in an area closer to the core portion 46a.

The elastic body 40 may have a number of through holes that penetrate the elastic body 40 in the first direction X instead of, or in addition to, the above-mentioned recessed portion 46, which is not described by reference to drawings. Provision of such through holes can make a portion without such a through hole more readily deformable. Thus, in order to make the soft portion 44 more readily deformable than the hard portion 42, it is preferred that the percentage in area of the through holes occupied in the soft portion 44 when viewed in the first direction X is greater than that occupied in the hard portion 42.

Other examples of the elastic body will now be described.

Figure 9:
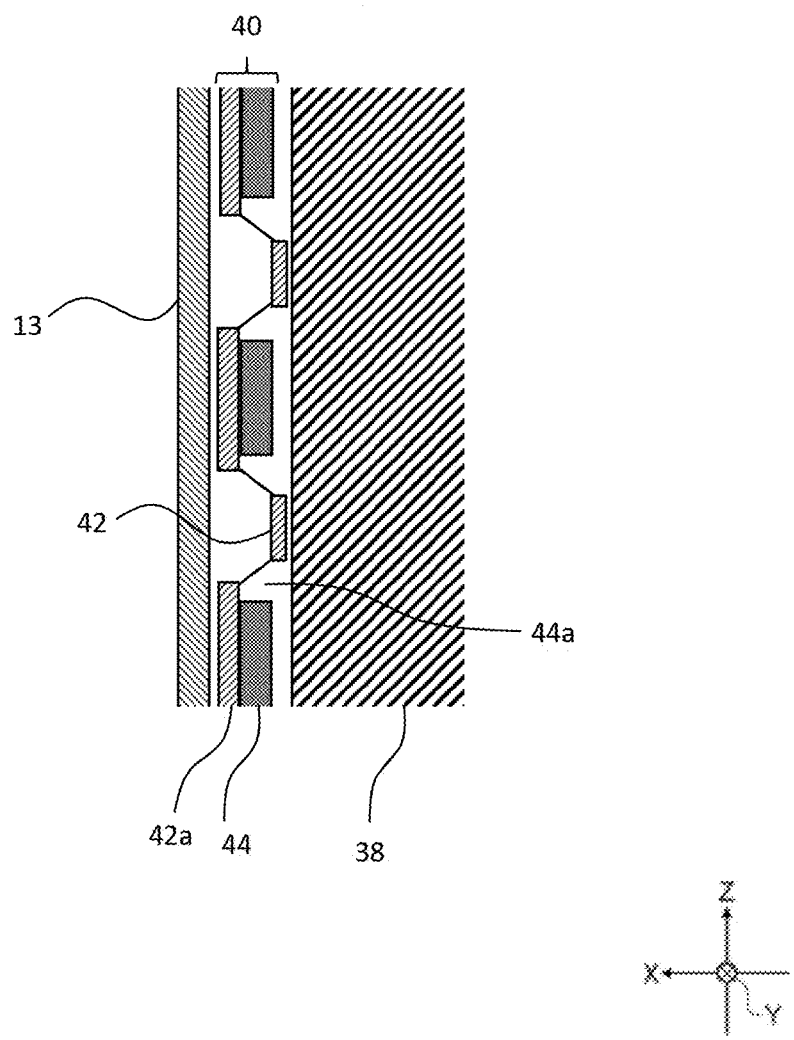
FIG. 9 is a schematic cross sectional view of a part of an elastic body held between an electrode body and an enclosure.

FIG. 9 is a partial schematic cross sectional view of an elastic body held between the electrode body and the enclosure. The elastic body 40 receives a load from the electrode body 38 in the lamination direction (the first direction X) of the elastic body 38. The elastic body 40 includes a base member 42a where the hard portion 42 having a predetermined hardness is formed, and the soft portion 44 that is softer than the hard portion 42. The hard portion 42 is a projecting portion projecting from the base member 42a toward the electrode body 38, and will fracture or plastically deform upon receipt of a predetermined or larger load. The soft portion 44 is shaped like a sheet, and disposed at a position closer to the electrode body 38 than is the base member 42a where the hard portion 42 is formed. The soft portion 44 is apart from the electrode body 38. The soft portion 44 has a through hole 44a at a position overlapping the hard portion 42 when viewed in the first direction X. The hard portion 42 is inserted into the through hole 44a such that the tip end of the hard portion 42 projects out of the soft portion 44.

As the shape of the hard portion 42 changes, the elastic body 40 shifts from a first state in which a load from the electrode body 38 is received with the hard portion 42 to a second state in which the load is received with the soft portion 44. That is, the elastic body 40 initially receives a load in the lamination direction of the electrode body 38, the load being generated due to expansion of the electrode body 38, with the hard portion 42 (a first state). When the electrode body 38 expands further due to some causes until application to the hard portion 42 of a load that is too large for the hard portion 42 to receive, the hard portion 42 fractures or plastically deforms. Thereupon, the electrode body 38 is brought into contact with the soft portion 44 to thereafter receive the load in the lamination direction of the electrode body 38 (a second state).

In the case of an elastic body having concaves and convexes, the compressive elastic modulus is calculated as "a compressive elastic modulus (MPa)=a load (N)/a projection area of the elastic body in the surface direction (mm²)×a deformed amount of the elastic body (mm)/the thickness (mm) of the convex portions of the elastic body)".

The electrolyte is, for example, a nonaqueous electrolyte; that is, an organic solvent (a nonaqueous solvent) containing supporting salt. Examples of the usable nonaqueous solvent include esters, ethers, nitriles, amides, or combination solvents of two or more kinds of these. Example of the supporting salt include lithium salts, such as $LiPF_6$.

EXAMPLES

This disclosure will now be further described by way of, but is not limited to, examples.

Example 1

[Formation of Positive Electrode]

As a positive electrode active material, a lithium transition metal composite oxide expressed as a general expression $LiNi_{0.82}Co_{0.15}Al_{0.03}O_2$ was used. This positive electrode active material, acetylene black, and polyvinylidene fluoride were mixed at a solid mass ratio of 97:2:1 to prepare a positive electrode mixture slurry, using N-methyl-2-pyrrolidone (NMP) as a dispersion medium.

As a positive electrode collector, an Al—Mg alloy foil with a thermal conductive rate of 150 W/(m·K) and a Mg content of 1.5 wt % was used.

The above-mentioned positive electrode mixture slurry was applied to each surface of the Al—Mg alloy foil, then dried, and rolled before being cut into a predetermined size for an electrode. This provided a positive electrode having a positive electrode active material layer formed on each surface of the positive electrode collector.

[Preparation of First Negative Electrode Mixture Slurry]

Graphite particles having a 10% proof stress of 3.9 MPa and a BET specific surface area of 2.1 m²/g (carbon-based active material particles A), a dispersion of styrene-butadiene rubber (SBR), and sodium carboxymethyl cellulose (CMC-Na) were mixed at a solid mass ratio of 100:1:1 to prepare a first negative electrode mixture slurry, using water as a dispersion medium.

[Preparation of Second Negative Electrode Mixture Slurry]

Graphite particles having a 10% proof stress of 5.7 MPa and a BET specific surface area of 2.9 m²/g (carbon-based active material particles B), a dispersion of styrene-butadiene rubber (SBR), and sodium carboxymethyl cellulose (CMC-Na) were mixed at a solid mass ratio of 100:1:1 to prepare a second negative electrode mixture slurry, using water as dispersion medium.

[Formation of Negative Electrode]

The first negative electrode mixture slurry was applied to each surface of a negative electrode collector made of a copper foil, then dried, and rolled. Thereafter, the second negative electrode mixture slurry was applied onto the coating film, then dried, and rolled to thereby form a negative electrode active material layer including a first layer derived from the first negative electrode mixture slurry and a second layer derived from the second negative electrode mixture slurry formed on the negative electrode collector. The resultant body was cut into a predetermined size for an electrode, whereby a negative electrode was obtained. The porosities of the first layer and the second layer were measured as 22% and 24%, respectively.

[Preparation of Electrolyte]

Ethylene carbonate (EC), methyl ethyl carbonate (EMC), and dimethyl carbonate (DMC) were mixed at a volume ratio of 3:3:4. $LiPF_6$ was dissolved in the mixed solvent at a density of 1.4 mol/L, whereby electrolyte was obtained.

[Formation of Nonaqueous Electrolyte Secondary Battery]

A negative electrode, a separator, and a positive electrode were laminated in this order, and then wound before being formed into a flat shape, to thereby form a flat winding electrode body. Then, the negative electrode and the positive electrode were connected to the positive electrode terminal and the negative electrode terminal, respectively. Thereafter, the result was stored inside an outer body made of an aluminum laminate, the above-mentioned electrolyte was poured into the outer body, and the opening of the outer body was sealed, whereby a nonaqueous electrolyte secondary battery was made.

The obtained nonaqueous electrolyte secondary battery was held by a pair of elastic bodies (foamed urethane having a compressive elastic modulus of 120 MPa), and then securely held by a pair of end plates, whereby a secondary battery module was made.

Example 2

A secondary battery module was made in the same manner as that in Example 1 except that an Al—Mg alloy foil with a thermal conductive rate of 138 W/(m·K) and a Mg content of 2.4 wt % was used as a positive electrode collector, and that a foamed urethane having a compressive elastic modulus of 60 MPa was used as an elastic body.

Example 3

A secondary battery module was made in the same manner as that in Example 1 except that an Al—Mg alloy foil with a thermal conductive rate of 117 W/(m·K) and a Mg content of 4.7 wt % was used as a positive electrode collector, and that a foamed urethane having a compressive elastic modulus of 60 MPa was used as an elastic body.

Example 4

A secondary battery module was made in the same manner as that in Example 1 except that the Al—Mg alloy foil used in Example 3 was used as a positive electrode collector, and that a foamed urethane having a compressive elastic modulus of 40 MPa was used as an elastic body.

Example 5

A secondary battery module was made in the same manner as that in Example 1 except that the Al—Mg alloy foil used in Example 3 was used as a positive electrode collector, and that a foamed urethane having a compressive elastic modulus of 5 MPa was used as an elastic body.

Example 6

A secondary battery module was made in the same manner as that in Example 1 except that the Al—Mg alloy foil used in Example 3 was used as a positive electrode collector, that a foamed urethane used in Example 2 was used as an elastic body, and that graphite particles having a 10% proof stress of 27 MPa and a BET specific surface area of 0.9 m2/g (carbon-based active material particles B) were used in preparation of the second negative electrode mixture slurry. The porosities of the first layer and the second layer in the negative electrode in Example 6 were measured as 22% and 26%, respectively.

Example 7

A secondary battery module was made in the same manner as that in Example 1 except that an Al—Mg alloy foil with a thermal conductive rate of 65 W/(m·K) and a Mg content of 93 wt % was used as a positive electrode collector, and that a foamed urethane used in Example 2 was used as an elastic body.

Example 8

A secondary battery module was made in the same manner as that in Example 1 except that the Al—Mg alloy foil used in Example 3 was used as a positive electrode collector, that the foamed urethane used in Example 2 was used as an elastic body, and that graphite particles with a 10% proof stress of 1.8 MPa and a BET specific surface area of 4.4 $m^2/g$ (carbon-based active material particles A) were used in preparation of the first negative electrode mixture slurry. The porosities of the first layer and the second layer in the negative electrode in Example 8 were measured as 23% and 24%, respectively.

Example 9

A secondary battery module was made in the same manner as that in Example 8 except that the Al—Mg alloy foil used in Example 3 was used as a positive electrode collector, that the foamed urethane used in Example 2 was used as an elastic body, that a rolling force 0.75 times that in Example 1 was applied to the coating film derived from the first negative electrode mixture in preparation of the negative electrode, and that a rolling force 0.7 times that in Example 1 was applied to the coating film derived from the second negative electrode mixture slurry. The porosities of the first layer and the second layer in the negative electrode in Example 9 were measured as 28% and 31%, respectively.

Example 10

A secondary battery module was made in the same manner as that in Example 1 except that the Al—Mg alloy foil used in Example 3 was used as a positive electrode collector, that the foamed urethane used in Example 2 was used as an elastic body, that graphite particles with a 10% proof stress of 11 MPa and a BET specific surface area of 3.5 $m^2/g$ (carbon-based active material particles B) were used in preparation of the second negative electrode mixture slurry, and that a rolling force 0.8 times that in Example 1 was applied to the coating film derived from the first negative electrode mixture slurry in preparation of the negative electrode. The porosities of the first layer and the second layer in the negative electrode in Example 10 were measured as 25% and 23%, respectively.

Comparative Example 1

A secondary battery module was made in the same manner as that in Example 1 except that an Al foil with a thermal conductive rate of 190 W/(m·K) and a Mg content of 0 wt % was used as a positive electrode collector.

Comparative Example 2

A secondary battery module was made in the same manner as that in Example 1 except that the Al—Mg alloy foil used in Example 3 was used as a positive electrode collector, that graphite particles with a 10% proof stress of 5.7 MPa and a BET specific surface area of 1.5 m²/g (carbon-based active material particles A) were used in preparation of the first negative electrode mixture slurry, and that graphite particles with a 10% proof stress of 27 MPa and a BET specific surface area of 0.9 m²/g (carbon-based active material particles B) were used in preparation of the second negative electrode mixture slurry. The porosities of the first layer and the second layer in the negative electrode in Comparative Example 2 were measured as 31% and 26%, respectively.

Comparative Example 3

A secondary battery module was made in the same manner as that in Example 1 except that the Al—Mg alloy foil used in Example 3 was used as a positive electrode collector, and that graphite particles with a 10% proof stress of 1.8 MPa and a BET specific surface area of 4.4 m²/g (carbon-based active material particles B) were used in preparation of the second negative electrode mixture slurry. The porosities of the first layer and the second layer in the negative electrode in Comparative Example 3 were measured as 25% and 28%, respectively.

Comparative Example 4

A secondary battery module was made in the same manner as that in Example 3 except that polyethylene terephthalate with a compressive elastic modulus of 2800 MPa was used as an elastic body.

Comparative Example 5

Graphite particles with a 10% proof stress of 5.7 MPa and a BET specific surface area of 2.9 m²/g, a dispersion of styrene-butadiene rubber (SBR), and sodium carboxymethyl cellulose (CMC-Na) were mixed at a solid mass ratio of 100:1:1, and a negative electrode mixture slurry was prepared using water as dispersion medium. The negative electrode mixture slurry was applied to each surface of a negative electrode collector made of a copper foil, dried, and rolled, whereby a negative electrode active material layer was formed on the negative electrode collector. The resultant body was cut into a predetermined size for an electrode to thereby obtain a negative electrode. The porosity of the negative electrode active material layer is measured as 24%. A secondary battery module was prepared in the same manner as that in Example 1 except that this negative electrode was used and that the Al—Mg alloy foil used in Example 3 was used as a positive electrode collector.

[Measurement of Heat Generation in Battery in Nailing Test]

A secondary battery module in each example and each comparative example was adjusted to be in the state of charge (SOC) 100% under a temperature condition of 25° C. Then, the secondary battery module was stabbed with a needle with a radius of 0.5 mm and curvature φ of the tip end portion of 0.9 mm at the speed of 0.1 mm/sec in the thickness direction of the nonaqueous electrolyte secondary battery such that the positive electrode communicated with the negative electrode to thereby cause internal short-circuiting. An ammeter was connected between the positive electrode and the negative electrode to measure the amount of current flowing to an outside load at occurrence of short-circuiting, to thereby calculate the amount of heat generated.

Table 1 shows the physical properties of the positive electrode collectors, the negative electrode active material layers (the first layer and the second layer), and the elastic bodies used in the respective examples and comparative examples, and the results of tests in the respective examples and comparative examples. Note that the physical properties of the negative electrode active material layer in the comparative example 5 are shown in the spaces for the second layer.

TABLE 1

| | POSITIVE ELECTRODE COLLECTOR | | SECOND LAYER | | | FIRST LAYER | | |
|---|---|---|---|---|---|---|---|---|
| | THERMAL CONDUCTIVE RATE (W/(m·K)) | Mg CONTENT (wt %) | BET (m²/g) | 10% PROOF STRESS (MPa) | POROSITY (%) | BET (m²/g) | 10% PROOF STRESS (MPa) | POROSITY (%) |
| EXAMPLE 1 | 150 | 1.5 | 2.9 | 5.7 | 24 | 3.9 | 2.1 | 22 |
| EXAMPLE 2 | 138 | 2.4 | 2.9 | 5.7 | 24 | 3.9 | 2.1 | 27 |
| EXAMPLE 3 | 117 | 4.7 | 2.9 | 5.7 | 24 | 3.9 | 2.1 | 22 |
| EXAMPLE 4 | 117 | 4.7 | 2.9 | 5.7 | 24 | 3.9 | 2.1 | 22 |
| EXAMPLE 5 | 117 | 4.7 | 2.9 | 5.7 | 24 | 3.9 | 2.1 | 22 |
| EXAMPLE 6 | 117 | 4.7 | 0.9 | 27 | 26 | 3.9 | 2.1 | 22 |
| EXAMPLE 7 | 65 | 93 | 7.9 | 5.7 | 24 | 3.9 | 7.1 | 22 |
| EXAMPLE 8 | 117 | 4.7 | 2.9 | 5.7 | 24 | 4.4 | 1.8 | 23 |
| EXAMPLE 9 | 117 | 4.7 | 2.9 | 5.7 | 31 | 4.4 | 1.8 | 28 |
| EXAMPLE 10 | 117 | 4.7 | 3.5 | 11 | 23 | 3.9 | 7.1 | 75 |
| COMPARATIVE EXAMPLE 1 | 190 | 0 | 2.9 | 5.7 | 94 | 3.9 | 2.1 | 29 |
| COMPARATIVE EXAMPLE 2 | 117 | 4.7 | 0.9 | 27 | 26 | 1.5 | 5.7 | 31 |
| COMPARATIVE EXAMPLE 3 | 117 | 4.7 | 4.4 | 1.8 | 28 | 3.9 | 2.1 | 25 |

TABLE 1-continued

| | | | | | | | | |
|---|---|---|---|---|---|---|---|---|
| COMPARATIVE EXAMPLE 4 | 117 | 4.7 | 2.9 | 5.7 | 24 | 3.9 | 2.1 | 22 |
| COMPARATIVE EXAMPLE 5 | 117 | 4.7 | 2.9 | 5.7 | 24 | — | — | — |

| | ELASTIC BODY COMPRESSIVE ELASTIC MODULUS (MPa) | TEST RESULT HEAT GENERATION IN BATTERY IN NAILING TEST (J) |
|---|---|---|
| EXAMPLE 1 | 120 | 20.5 |
| EXAMPLE 2 | 60 | 15.0 |
| EXAMPLE 3 | 60 | 5 or less |
| EXAMPLE 4 | 40 | 5 or less |
| EXAMPLE 5 | 5 | 5 or less |
| EXAMPLE 6 | 60 | 5 or less |
| EXAMPLE 7 | 60 | 5 or less |
| EXAMPLE 8 | 60 | 5 or less |
| EXAMPLE 9 | 60 | 5 or less |
| EXAMPLE 10 | 60 | 5 or less |
| COMPARATIVE EXAMPLE 1 | 120 | 45.1 |
| COMPARATIVE EXAMPLE 2 | 120 | 33.2 |
| COMPARATIVE EXAMPLE 3 | 120 | 36.2 |
| COMPARATIVE EXAMPLE 4 | 2800 | 47.0 |
| COMPARATIVE EXAMPLE 5 | 120 | 30.2 |

With respect to secondary battery modules each including a negative electrode active material layer having a laminated structure including a first layer containing first carbon-based active material particles with a 10% proof stress of 3 MPa or less and a second layer containing second carbon-based active material particles with a 10% proof stress of 5 MPa or greater, batteries in Examples 1 to 10, in which the compressive elastic modulus of the elastic body was 5 MPa to 120 MPa, and the positive electrode collector contained Al and an element other than Al and had a thermal conductive rate in the range of 65 W/(m·K) to 150 W/(m·K), all generated less heat in a nailing test, as compared with those in Comparative Examples 1 to 5, which do not satisfy the above-mentioned requirements.

REFERENCE SIGNS LIST

1 secondary battery module, 2 stacked body, 4 end plate, 6 binding member, 8 cooling plate, 10 nonaqueous electrolyte secondary battery, 12 insulation spacer, 13 enclosure, 14 outer can, 16 sealing plate, 18 output terminal, 38 electrode body, 38a positive electrode, 38b negative electrode, 38d separator, 39 winding core portion, 40 elastic body, 42 hard portion, 42a base member, 44 soft portion, 44a through hole, 46 recessed portion, 46a core portion, 46b linear portion, 50 positive electrode collector, 52 positive electrode active material layer, 54 negative electrode collector, 56 negative electrode active material layer, 56a first layer, 56b second layer, 58 nail.

The invention claimed is:

1. A secondary battery module, comprising:
   at least one nonaqueous electrolyte secondary battery, and
   an elastic body disposed together with the nonaqueous electrolyte secondary battery, for receiving a load from the nonaqueous electrolyte secondary battery in a direction in which the nonaqueous electrolyte secondary battery and the elastic body are disposed,
   wherein
   the nonaqueous electrolyte secondary battery includes an electrode body including a laminate of a positive electrode, a negative electrode, and a separator disposed between the positive electrode and the negative electrode, and an enclosure for storing the electrode body therein,
   the elastic body has a compressive elastic modulus of 5 MPa to 120 MPa,
   the positive electrode includes a positive electrode collector containing Al and an element other than Al,
   the positive electrode collector has a thermal conductive rate of 65 W/(m·K) to 150 W/(m·K),
   the negative electrode includes a negative electrode collector and a negative electrode active material layer including a first layer and a second layer sequentially formed from a side with the negative electrode collector,
   the first layer contains negative electrode active material particles containing first carbon-based active material particles with a 10% proof stress of 3 MPa or less, and
   the second layer contains negative electrode active material particles containing second carbon-based active material particles with a 10% proof stress of 5 MPa or greater.

2. The secondary battery module according to claim 1, wherein the negative electrode active material particles contained in the second layer each have a BET specific surface area that is smaller than a BET specific surface area of the negative electrode active material particles contained in the first layer.

3. The secondary battery module according to claim 1, wherein the second layer has a porosity that is larger than a porosity of the first layer.

4. The secondary battery module according to claim 1, wherein
the element other than Al includes Mg, and
the positive electrode collector has an Mg content of 1.5 wt % or greater.

5. A nonaqueous electrolyte secondary battery, comprising:
an electrode body including a laminate of a positive electrode, a negative electrode, and a separator disposed between the positive electrode and the negative electrode,
an elastic body for receiving a load from the electrode body in a lamination direction of the electrode body, and
an enclosure for storing the electrode body and the elastic body therein,
wherein
the elastic body has a compressive elastic modulus of 5 MPa to 120 MPa,
the positive electrode includes a positive electrode collector containing Al and an element other than Al,
the positive electrode collector has a thermal conductive rate of 65 W/(m·K) to 150 W/(m·K),
the negative electrode includes a negative electrode collector and a negative electrode active material layer including a first layer and a second layer sequentially formed from a side with the negative electrode collector, and
the first layer contains negative electrode active material particles containing first carbon-based active material particles with a 10% proof stress of 3 MPa or less, and
the second layer contains negative electrode active material particles containing second carbon-based active material particles with a 10% proof stress of 5 MPa or greater.

* * * * *